United States Patent [19]

Bauer et al.

[11] Patent Number: 4,512,495
[45] Date of Patent: Apr. 23, 1985

[54] SAUCEPAN LID WITH DETACHABLE HANDLE

[75] Inventors: Ewald Bauer, Geislingen; Jürgen Krejza, Kuchen, both of Fed. Rep. of Germany

[73] Assignee: Wurttembergische Metallwarenfabrik AG., Fed. Rep. of Germany

[21] Appl. No.: 600,186

[22] Filed: Apr. 13, 1984

[30] Foreign Application Priority Data

Apr. 20, 1983 [DE] Fed. Rep. of Germany ....... 3314346

[51] Int. Cl.³ .............................................. B65D 45/00
[52] U.S. Cl. .................................................... 220/316
[58] Field of Search ................. 220/94, 316, 361, 367, 220/202, 203, 208, 209

[56] References Cited

U.S. PATENT DOCUMENTS 4,103,801 8/1978 Walker ................................ 220/316
4,251,007 2/1981 Behnisch ............................ 220/316
4,423,825 1/1984 Baumgarten ........................ 220/316

FOREIGN PATENT DOCUMENTS 3002204 7/1981 Fed. Rep. of Germany .

Primary Examiner—George T. Hall
Attorney, Agent, or Firm—Arnold, White & Durkee

[57] ABSTRACT

Figure 1:
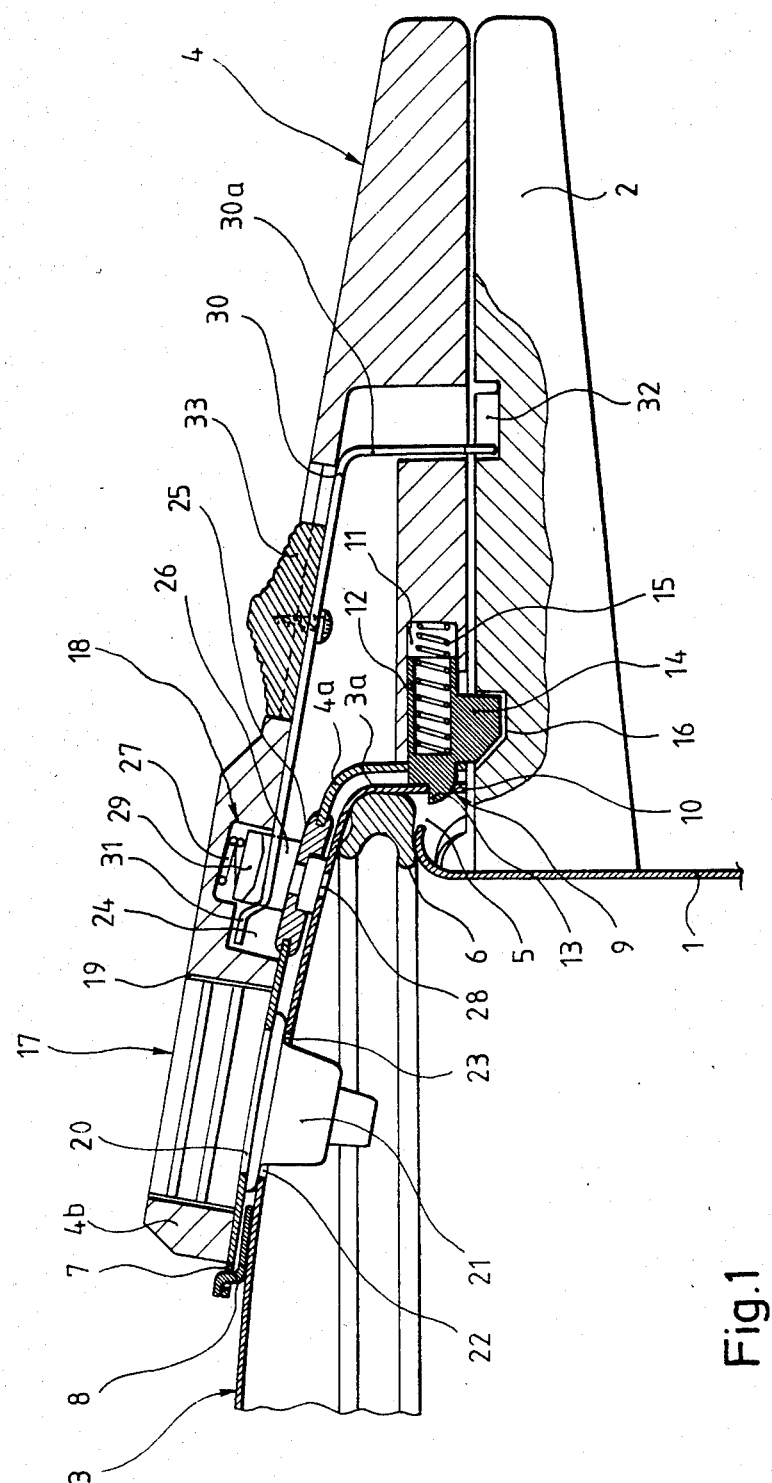

The invention relates to a saucepan lid having a lid handle detachably secured thereto, particularly for a steam pressure cooker, including monitoring elements disposed within said lid handle. Means are provided for permitting said handle to be detached from said lid without technical difficulties and to be safely re-attached thereto. To this effect the lid and lid handle are provided with projections and engagement recesses at locations permitting them to be brought into mutual engagement for attaching the handle to the lid and to be readily released from such engagement for detaching the handle, at least one such projection forming a movable component of a locking closure means. In a preferred embodiment the locking closure means is designed as a snap-engagement locking means (FIG. 1).

14 Claims, 3 Drawing Figures

SAUCEPAN LID WITH DETACHABLE HANDLE

DESCRIPTION

The present invention relates to a saucepan handle of the type defined in the generic clause of claim 1.

Connections between saucepan lids and handles therefor are known in numerous embodiments. In the majority of these embodiments, the handle is fixedly attached to the lid, so that it can only be detached therefrom by the application of force, possibly accompanied by destruction. In the case of lids the handle of which is desired to be replaceable in case of damage, a releasable attachment is accomplished by a threaded connection in known embodiments. Examples include the handles of pressure cooker lids, the laterally projecting handles of which carry locking elements cooperating with a handle of the cooker itself so as to prevent the pressure cooker from being opened while under pressure. A handle for a pressure cooker adapted to be secured to a lid thereof by means of a theaded bolt and a nut is known from DE-OS No. 3,002,204. In this case, the handle is intended to be detached not only in an emergency, i.e. for replacement, but also for each cleaning operation. The handle contains control elements for controlling the cooking process, such as a pressure indicator and/or a safety valve and/or a temperature indicator. These elements are disposed in cavities of a handle portion extending over a part of the lid and sealed at least towards the interior of the pressure cooker, so that cleaning of the detached handle including the sealing surfaces of the cavities is readily accomplished. Although the cleaning operation thus offers no difficulties, the operation of detaching the handle requires the threaded connection to be released. In this connection it has unfortunately been found that there are numerous housewifes who permit themselves to be deterred thereby from thoroughly cleaning the surfaces between the lid and handle. This is not due to the negligible effort of releasing the threaded nut, but rather to an aversion against "technical activities".

Added to this is the fear of being unable to restore the once released connection, of loosing the threaded nut and/or sometimes an excessively tightened nut. Insufficient cleaning of the surfaces between the lid and the control elements may in the long run however impair the functions of these elements, and thus the safe operation of the cooker.

It is an object of the present invention to provide a saucepan lid of the type defined in the introduction, the lid of which is quickly and safely detachable and reattachable even by technically unskilled persons.

This object is attained according to the invention by the characteristic features of claim 1.

The novel type of connection is safely operable in a simple manner. Detaching the handle does not require any component to be released separately, i.e. the handle is releasable from the lid as an integral unit whithout disturbing the remainder of the lid. A tool is neither required, nor is the necessity of using a tool brought to mind. Quite to the contrary, the construction of the connection elements forcefully suggests frequent handling and thus the necessity of cleaning.

The characteristics of claims 2 and 3 relate to the positioning of engagement recesses and projections on the lid and the handle, respectively, found to be advantageous with a view to simplified manufacture as well as unproblematic handling. A handle containing control or monitoring elements must necessarily include a portion overlying the lid. Securing elements located adjacent such portions are thus particularly effective for ensuring a safe connection.

A preferred embodiment is defined by the characteristic of claim 4. A snap engagement closure audibly coming into engagement on securing the handle gives a safe indication of the proper seating of the handle on the lid. In addition, snap engagement connections are considered as a common every-day feature, and not as a technical problem.

Claims 5 and 6 relate to economically producible and readily operable embodiments of the snap engagement locking means. In particular, the location of the spring within a shell formed integrally with the latch provides for a closed construction desirable in view of frequent cleaning of the handle.

In addition to monitoring and control elements, steam pressure cookers are conventionally provided with safety devices preventing the lid from being released from the cooker itself while under pressure. Known safety devices include locking elements between the cooker and lid handles permitting pressure within the cooker to be generated only when both handles are disposed one above the other. Although it appears improbable that anybody would try to detach the lid handle from the lid while the cooker is under pressure, a safety device for preventing this occurrence may still be desirable. This safety feature is accomplished in an advantageously simple manner by the characteristic of claim 11.

The characteristics of claims 12 and 13 relate to an embodiment particularly suitable for economic manufacture. Of particular advantage in use is the low weight in combination with good strength properties. In contrast to a handle made solely of a synthetic material, the metal plate is capable of withstanding excessive loads occurring for instance if the handle is dropped or in the case of excessive pressure within the cooker. This precludes the possibility of accidents. Mounting of the monitoring elements in the metal plate is easily accomplished, and the elements are safely retained therein. In addition, the shape of the plastics housing portion may be selected in view of the requirements of the manufacturing process as well as practical and aesthetical demands. In the case of damage it is readily replaced.

An additional safety feature is provided in accordance with the invention by the characteristic of claim 14. As long as the safety valve is prevented from closing, it is impossible for a pressure buildup within the cooker to occur. An incompletely secured lid handle can thus not be the cause of an accident. On the other hand, there is no possibility of accidentally detaching the lid handle without beforehand relieving the pressure within the cooker.

Figure 2:
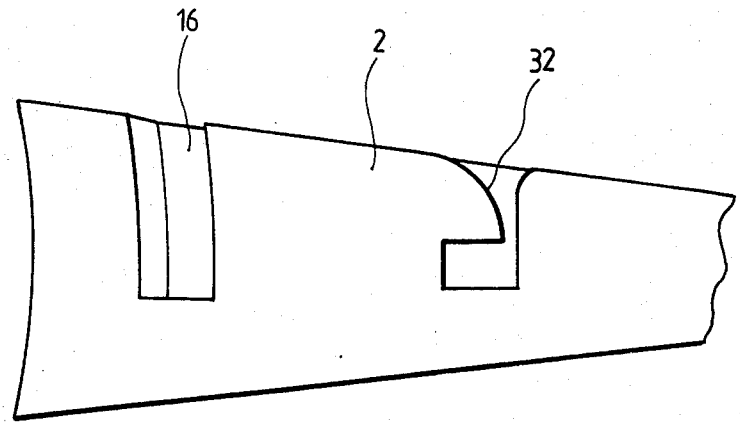
Figure 3:
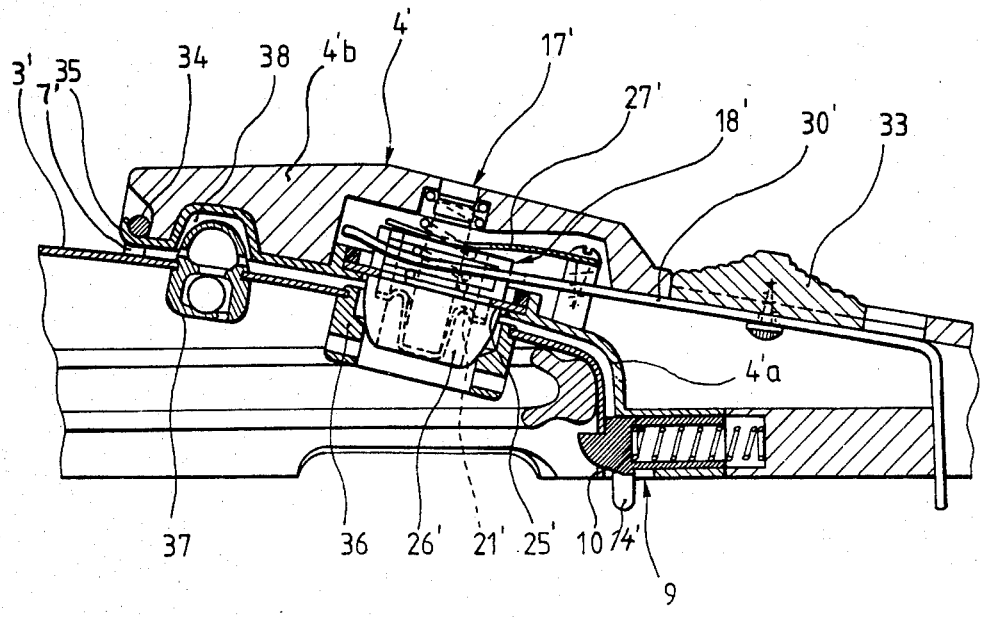

Further details and advantages of the invention will become more clearly evident from the following description of exemplary embodiments of a suacepan lid according to the invention with reference to the accompanying drawings, wherein:

FIG. 1 shows a sectional view of a lid handle in combination with a partially shown cooker and lid therefor according to a first embodiment, FIG. 2 shows a partial top plan view of the cooker handle shown in FIG. 1, and FIG. 3 shows a partial sectional view of a lid handle in a modified embodiment of the invention.

Shown in FIG. 1 is a wall portion 1 of a cooker having a handle 2 secured thereto. The cooker is covered by a lid 3, only partially shown, having a lid handle generally indicated at 4. FIG. 1 shows the assembly in the pressure cooking position with the cooker handle 2 and lid handle 4 aligned one above the other. In this position, lid 3 is locked to cooker 1 by rim portions 5 acting as a bayonet catch, with a lip seal 6 located therebetween.

Lid handle 4 generally consists of a metal plate 4a forming part of its lower surface, and a plastics housing portion 4b covering the sides and upper surface of metal plate 4a. While the plastics housing portion forms the grip end of the handle and generally defines the shape and appearance of the handle, the metal plate constitutes the supporting core of the handle and a base for mounting the elements disposed within the handle.

Lid handle 4 is releasably secured to lid 3 at two points: At the end of a handle portion extending over lid 3, metal plate 4a is formed with a recess 7 for engagement with a hook-shaped lug 8 fixedly secured to lid 3. At a rim 3a of lid 3 extending substantially parallel to the wall of cooker 1, a connection is formed by a snap engagement locking means generally designated 9. Lid rim 3a is formed with a recess 10. Plastics housing portion 4b of lid handle 4 is formed with a cavity 11 containing a cup-shaped shell 12. The closed end of shell 12 faces towards lid 3 and is formed with a latch 13 projecting from handle 4 in the direction of lid 3. Shell 12 is further formed with a projection 14 extending substantially at right angles to latch 13. A compression spring 15 is kept under compression between the closed end of shell 12 and an end wall of cavity 11 so as to bias shell 12 outwards into engagement of latch 13 with recess 10 in lid rim 3a. For attaching lid handle 4 to lid 3, recess 7 is first engaged with lug 8 by holding lid handle at an inclined position with respect to the lid surface, from which position it is then pivoted downwards to a position resting on the lid surface. In this position of the handle relative to the lid, latch 13 comes into snap engagement with recess 10. The handle may be detached from the lid by firstly releasing snap engagement locking means 9 by retracting latch 13 against the force of spring 15, whereupon the lid handle is raised and released from hook-shaped lug 8. The projection 14 of shell 12 cooperates with a recess 16 formed in cooker handle 2 for preventing lid handle 4 from being accidentally released while the interior of the cooker is under pressure, whereby the monitoring elements located in the lid handle as described in the following would otherwise be rendered ineffective. As shown in the top plan view of the cooker handle in FIG. 2, recess 16 extends from one side edge of handle 2 over a portion of its upper surface. As the buildup of pressure within the cooker requires the two handles to be aligned above one another, the means attaching the lid handle to the lid are safely locked under these conditions.

The fact that the lid handle is quickly and readily detachable from the lid and subsequently re-attachable thereto in the same manner constitutes an essential prerequisite for the proper functioning of the monitoring elements disposed in the lid handle, in the FIG. 1 embodiment a pressure indicator 17 and a safety valve 18. Both these elements are completely located within the lid handle in a sealing manner, so that there are no problems in cleaning the underside of the lid or lid handle, for instance under running water, without any danger for these elements. As the operation of attaching and detaching the lid handle does not call for the use of any tool, there is also no danger of these elements being damaged in the process. Metal plate 4a is used as a means for mounting pressure indicator 17 and safety valve 18.

Pressure indicator 17 is disposed in a cavity 19 of lid handle 4 having an opening 20 at the lower surface of the handle. The steam pressure acts on pressure indicator 17 through a diaphragm bellows 21 inserted in an opening 22 of lid 3 and forming a sealing collar 23 between lid 3 and handle 4.

Safety valve 18 is disposed within a chamber 24 formed in lid handle 4 and sealed by a diaphragm 25. It has a valve body 26 consisting of a cylindrical, partially hollow metal body containing a spring 27 biasing it into engagement with a lid opening 28 for sealing the latter.

Valve body 26 is formed with integral projections 29 for cooperating with a linkage 30. In the region of the safety valve linkage 30 is of bifurcate configuration including crank-shaped end portions 31. The other end portion 30a of linkage 30 is bent downwards so as to project from the underside of handle 4 at a location spaced from lid 3. End portion 30a cooperates with a partially arcuate guide recess 32 formed in the top surface of cooker handle 2 as shown in FIG. 2 to form a safety locking means for preventing lid 3 to be accidentally rotated relative to cooker 1 while the latter is under pressure. For relieving pressure linkage 30 may be displaced by means of a slide button 33, causing crank-shaped end portions 31 to engage projections 29 for lifting valve body 26, thus permitting the pressure to escape through lid opening 28.

FIG. 3 shows part of a lid 3' and a part of a lid handle 4' associated therewith. In the following, only the differences between the two embodiments shall be described in detail, parts corresponding to one another being designated by the same reference numerals with a prime.

For attaching handle 4' to lid 3', the top surface of the latter is provided with a clip 34, while metal plate 4a' of handle 4' is formed with an upwardly bent hook 35 adapted to be inserted into an opening 7' formed by clip 34 with handle 4' held at an inclined position. The snap engagement locking means 9 between lid handle 4 and lid 3 is similar to the embodiment already described, with only the projection 14' used for locking engagement with the cooker handle (not shown) being of somewhat different shape.

Also different are the safety and monitoring elements mounted on metal plate 4a' within lid handle 4'. The pressure indicator 17' is here fully integrated in the safety valve 18' and completely sealed by a diaphragm bellows 21'. Safety valve 18' is sealingly clamped in handle 4' by means of diaphragm 25'. A spring 27' in the form of a leaf spring is provided for biassing valve body 26' into sealing engagement with a valve seat 36 mounted in lid 3'.

For relieving the pressure within the cooker, valve body 26' cooperates with a linkage 30' of a construction corresponding to that shown in FIG. 1.

A safety and venting valve 37 having a resilient body is buttoned into the top surface of lid 3' so that part thereof projects thereabove. Lid handle 4' extends over this valve, so that it is received in a recess 38 formed in the lower surface of handle 4'. The venting valve does not require any specific maintenance or sealing, so that it may be cleaned together with the lid.

In a further embodiment of the invention not shown in the drawings, locking means 9 is provided with an extension cooperating with the downwards bent end portion 30a of linkage 30 in the following manner: The locking means can only be opened after safety valve 18 has been opened. Otherwise the extension of the locking means moves the bent end portion 30a towards the end of the handle. On the other hand, linkage 30 is only capable of closing safety valve 18 when locking means 9 is in the locked position.

Details of the safety and monitoring elements as well as of the snap engagement locking means and the attachment of the lid handle by means of recesses and projections may be varied within the scope of the invention, as long as proper sealing of the various components is ensured.

We claim:

1. A saucepan lid having a handle detachably secured thereto, particularly for a pressure cooker, including monitoring elements sealingly mounted within the lid handle, characterized in that said lid handle (4) and said lid (3) are provided with projections (8; 35) and engagement recesses (7; 7') adapted to be brought into mutual engagement for securing said lid handle and to be released from one another for detaching said lid handle, at least one projection (13) forming a movable component of a locking closure means (9).

2. A lid according to claim 1, characterized in that said locking closure means (9) is located adjacent a rim (3a) of said lid.

3. A lid according to claim 2, characterized in that an engagement opening (7) or a projection (8), respectively, is located on the top surface of said lid at a position spaced from said locking closure means (9).

4. A lid according to any of claims 1 to 3, characterized in that said locking closure means is formed as a snap engagement closure (9).

5. A lid according to claim 4, characterized in that said snap engagement closure (9) comprises a spring-biased latch (13) supported in said lid handle (4) and a recess (10) formed in the rim (3a) of said lid.

6. A lid according to claim 5, characterized in that said latch (13) is formed on a shell (12) containing a compression spring (15) and mounted in a cavity (11) of said lid handle (4) supporting the free end of said spring.

7. A lid according to claim 4, characterized in that a clip (34) is located on the top surface of said lid, an end portion of said handle extending over said lid (3') being provided with a lug (35) adapted to be inserted in an opening (7') underneath said clip by a pivoting movement.

8. A lid according to claim 7, characterized in that the width of said lug (35) is smaller than that of said handle (4').

9. A lid according to claim 7, characterized in that said lug (35) is of hook-shaped bent configuration.

10. A lid according to claim 4, characterized in that said lid (3) is provided with a hook-shaped lug (8) said lid handle (4) being provided with a recess (7) adapted to be engaged with said lug by a pivoting movement.

11. A lid according to any of claims 1 to 3 for a steam pressure cooker having a handle extending underneath said lid handle in the pressure-cooking position, characterized in that the movable locking closure component (13) of said lid handle (4) is formed with a projection (14) facing towards the handle (2) of the pressure cooker and adapted to be received in a recess (16) of said pressure cooker handle (2) so as to prevent said locking closure means (9) from being opened in the pressure-cooking position.

12. A lid, particularly in accordance with claim 1, characterized in that said lid handle (4; 4') comprises a metal plate (4a; 4a') mounting said monitoring elements (17, 18).

13. A lid according to claim 12, characterized in that said metal plate (4a; 4a') is covered by a plastic housing portion (4b; 4b') at least on its side facing towards the top surface of the lid.

14. A lid according to any of claims 1 to 3, characterized in that said locking closure means (9) is associated with actuating means (30) for opening and closing a safety valve (18) in such a manner that said safety valve is permitted to close only in the locking position of said locking closure means, and said locking closure means is releasable only when said safety valve is in its open position.

* * * * *